United States Patent
Prunean

(10) Patent No.: US 8,706,319 B2
(45) Date of Patent: Apr. 22, 2014

(54) SPACE POSITIONING SYSTEM

(75) Inventor: Cornel Prunean, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 133 days.

(21) Appl. No.: 13/328,228

(22) Filed: Dec. 16, 2011

(65) Prior Publication Data
US 2013/0158743 A1   Jun. 20, 2013

(51) Int. Cl.
    *G01S 19/00* (2010.01)
(52) U.S. Cl.
    USPC .............. 701/2; 342/357.2; 342/357.39
(58) Field of Classification Search
    USPC ............ 701/2, 13, 532; 342/357.39, 357.2,
         342/357.29, 357.42, 357.48, 357.59,
         342/357.68, 357.22; 455/12.1, 3.02, 427
    See application file for complete search history.

(56) References Cited

U.S. PATENT DOCUMENTS

| | | | |
|---|---|---|---|
| 6,009,376 A * | 12/1999 | Brodie et al. | 701/480 |
| 6,134,484 A | 10/2000 | Geier et al. | |
| 6,608,589 B1 | 8/2003 | Devereux et al. | |
| 7,860,617 B1 * | 12/2010 | Gaylor et al. | 701/13 |
| 2002/0196180 A1 | 12/2002 | Chang | |
| 2008/0045146 A1 * | 2/2008 | Wahlberg et al. | 455/12.1 |
| 2008/0059009 A1 * | 3/2008 | Fedora et al. | 701/13 |
| 2013/0103343 A1 * | 4/2013 | Liu | 702/141 |

FOREIGN PATENT DOCUMENTS

WO   2008123897 A2   10/2008

OTHER PUBLICATIONS

Montenbruck et al., "A real-time kinematic GPS sensor for spacecraft relative navigation," Aerospace Science and Technology, Elsevier, vol. 6, Issue 6, Oct. 2002, pp. 435-449.
Mur et al., "Satellite Navigation using GPS," ESA Bulletin No. 90, May 1997, 8 pp., accessed Nov. 15, 2011, http://www.esa.int/esapub/bulletin/bullet90/b90mur.htm.
Bamford et al., "Innovation: Spacecraft Navigator; Autonomous GPS Positioning at High Earth Orbits," GPS World, Apr. 2006, 4 pp.
EP Search Report, dated Nov. 27, 2013, regarding Application No. EP12195523.1, 11 pages.

* cited by examiner

*Primary Examiner* — Marthe Marc-Coleman
(74) *Attorney, Agent, or Firm* — Yee & Associates, P.C.

(57) ABSTRACT

A method and apparatus comprising a satellite, an antenna system associated with the satellite, and a transmitter in the satellite. The antenna system is configured to transmit a signal in a direction away from a surface of an earth. The transmitter is configured to transmit location information in the signal using the antenna system.

18 Claims, 7 Drawing Sheets

SPACE POSITIONING SYSTEM

BACKGROUND INFORMATION

1. Field

The present disclosure relates generally to vehicles and, in particular, to spacecraft. Still more particularly, the present disclosure relates to a method and apparatus for navigating spacecraft using global positioning system signals.

2. Background

Spacecraft navigate through space using information from the ground. Oftentimes, a spacecraft receives commands from the ground or commands from an operator inside the spacecraft. Commands may be received by the spacecraft from ground stations to provide a flight path for the spacecraft. Based on these commands, thrusters and other devices may be operated to place the spacecraft in a desired location or orbit above the earth.

This type of navigation for spacecraft involves having ground stations on the earth. These ground stations transmit commands and other information to a spacecraft to control the movement of the spacecraft. If insufficient ground stations are present in different locations on the earth, a spacecraft may be unable to receive commands during some periods of time when passing over portions of the earth where ground stations are absent. These periods of time occur when the spacecraft is unable to communicate with the ground stations. As a result, the spacecraft may be lost or unable to maneuver at times because of the loss of ground control.

Ground control systems typically have numerous ground stations in various locations on the earth to provide as much coverage as possible for sending commands to spacecraft. Ideally, the ground stations provide continuous coverage for the spacecraft. This situation, however, is not always possible. These types of systems may be more expensive than desired because of the number of ground stations used to communicate with the spacecraft when the spacecraft is in different positions over the earth.

Further, in some cases, placing a ground station in a desired location may be difficult. Obtaining permission from a particular country or other entity may be difficult in some cases.

Therefore, it would be desirable to have a method and apparatus that takes into account at least some of the issues discussed above as well as possibly other issues.

SUMMARY

In one illustrative embodiment, an apparatus comprises a satellite, an antenna system associated with the satellite, and a transmitter in the satellite. The antenna system is configured to transmit a signal in a direction away from a surface of an earth. The transmitter is configured to transmit location information in the signal using the antenna system.

In another illustrative embodiment, a method for moving a spacecraft is present. A number of signals is received from a number of satellites at the spacecraft. The number of signals is transmitted from a number of antenna systems associated with the number of satellites. The number of antenna systems is configured to transmit the number of signals in a direction away from a surface of an earth. Location information in the number of signals received from the number of satellites is identified. The spacecraft is moved using the location information.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use and further objectives thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more considerations. For example, the different illustrative embodiments recognize and take into account that one manner in which spacecraft may navigate with less assistance from ground stations is through the use of global positioning system satellites. The illustrative embodiments recognize and take into account that the location information transmitted by global positioning system satellites may provide information needed for spacecraft to navigate without receiving commands from a ground station.

The illustrative embodiments recognize and take into account, however, that global positioning system satellites have antennas that are optimized to direct signals toward the earth. These signals may not have sufficient strength for use by spacecraft that may be located in locations that are higher than the orbits of these global positioning system satellites.

The illustrative embodiments recognize and take into account that receivers may be configured to amplify and detect these weaker signals transmitted by global positioning system satellites. These types of systems, however, may be more expensive and complex than desired.

Thus, the illustrative embodiments provide a method and apparatus for spacecraft to navigate using location information transmitted by satellites, such as global positioning system satellites.

Figure 1:
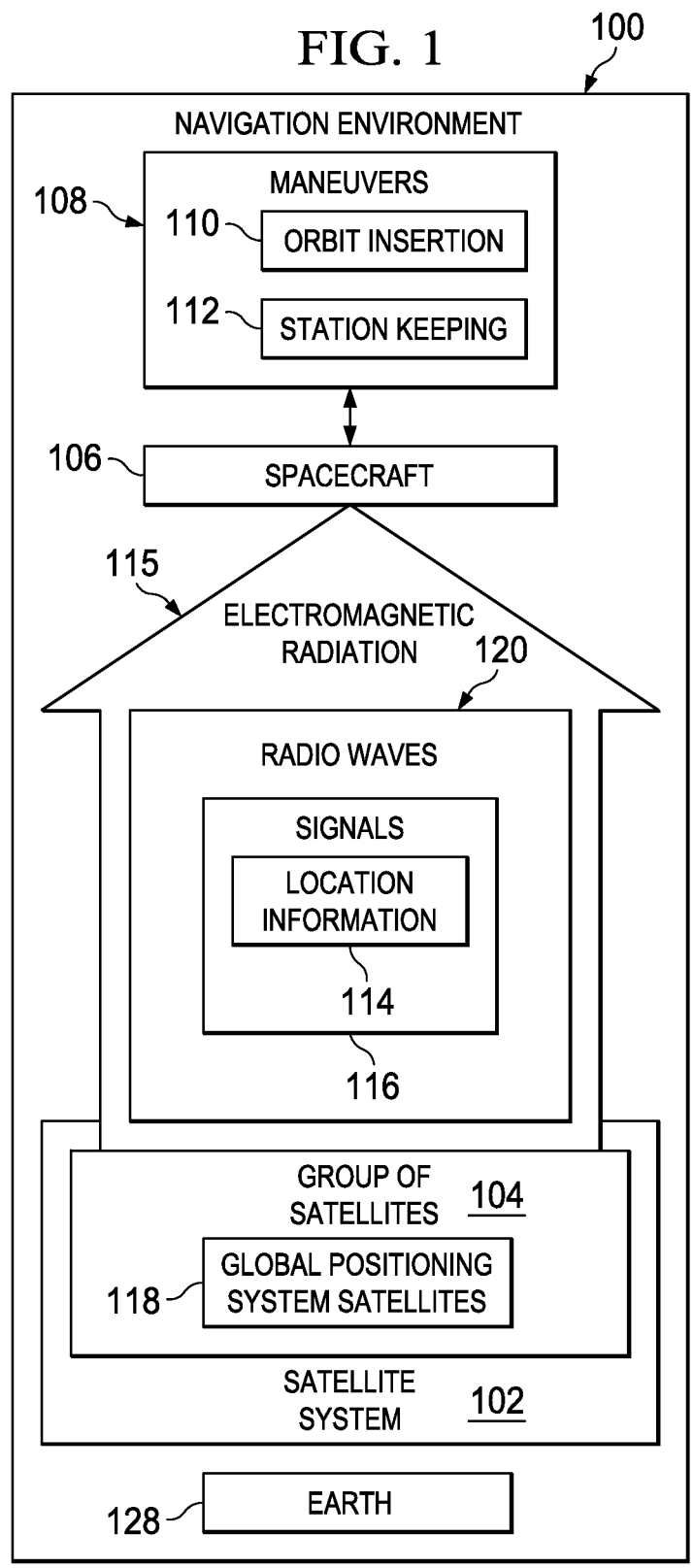
FIG. 1 is an illustration of a block diagram of a navigation environment in accordance with an illustrative embodiment.

With reference now to the figures and, in particular, with reference to FIG. 1, an illustration of a block diagram of a navigation environment is depicted in accordance with an illustrative embodiment. Navigation environment 100 includes satellite system 102. Satellite system 102 comprises group of satellites 104. As depicted, group of satellites 104 orbit Earth 128.

Additionally, spacecraft 106 also may be present in navigation environment 100. In this illustrative example, spacecraft 106 may be, for example, without limitation, a satellite, a space shuttle, a capsule, a space station, or some other suitable type of spacecraft. Spacecraft 106 is configured to perform maneuvers 108 in navigation environment 100. These maneuvers may include, for example, without limitation, at least one of orbit insertion 110, station keeping 112, and other suitable types of maneuvers.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C.

In these illustrative examples, spacecraft 106 performs maneuvers 108 using location information 114. Location information 114 is transmitted in electromagnetic radiation 115 from group of satellites 104 in satellite system 102. In these illustrative examples, electromagnetic radiation 115 may be signals 116 that encode location information 114 and are also received by spacecraft 106. In these illustrative examples, group of satellites 104 are global positioning system satellites 118. Signals 116 take the form of radio waves 120 transmitted by global positioning system satellites 118 in this illustrative example.

In these illustrative examples, signals 116 are configured to have a strength that is sufficient for use by spacecraft 106 when spacecraft 106 is located in a higher position relative to group of satellites 104. As depicted, spacecraft 106 is considered to have a higher position relative to group of satellites 104 when spacecraft 106 is farther away from Earth 128. In other words, spacecraft 106 may have a higher altitude than group of satellites 104. For example, spacecraft 106 may be a satellite having an orbit that is higher than satellites in group of satellites 104. In particular, group of satellites 104 is configured to transmit location information 114 in a direction away from Earth 128.

Figure 2:
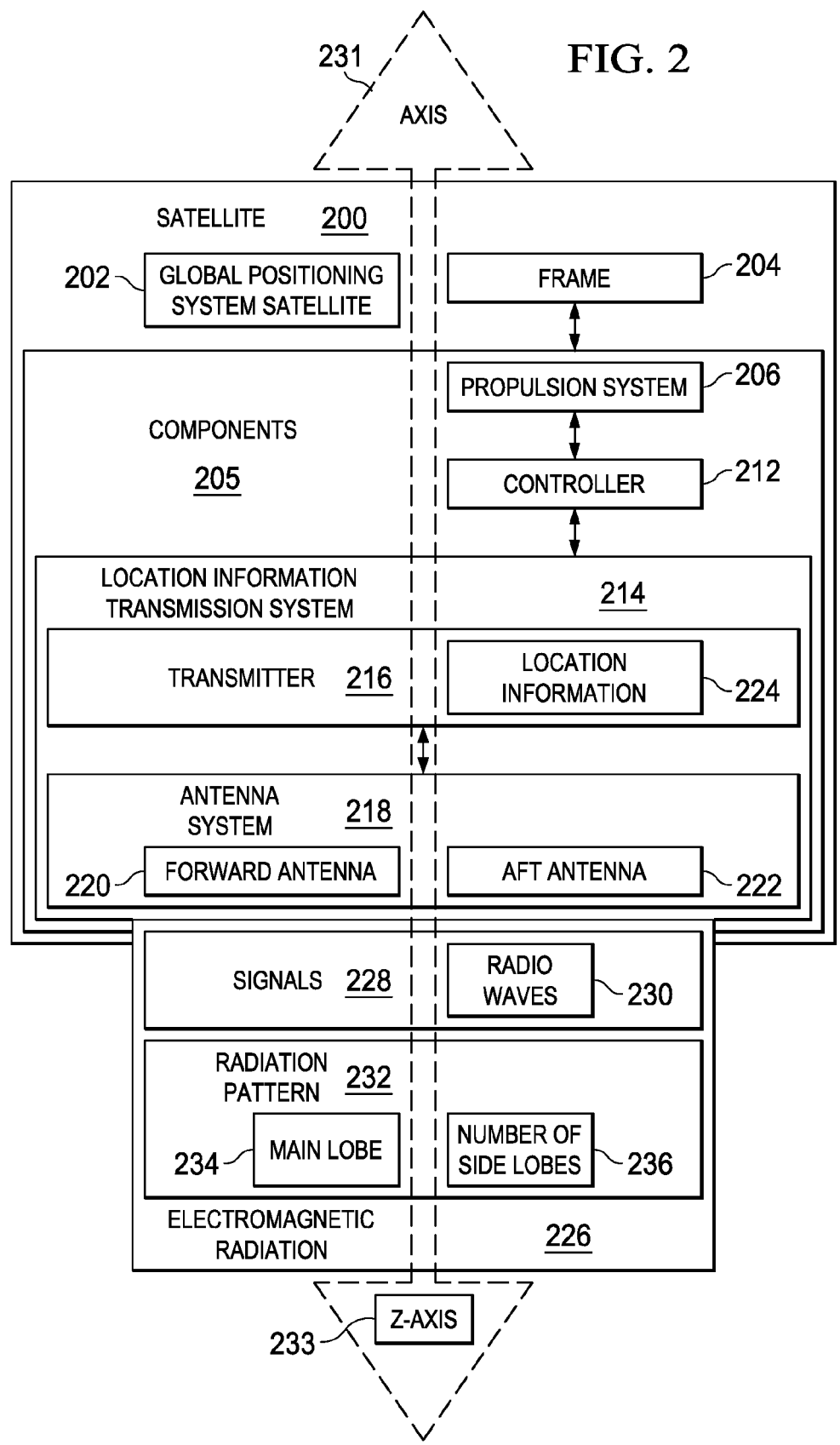
FIG. 2 is an illustration of a block diagram of a satellite in a satellite system in accordance with an illustrative embodiment.

With reference now to FIG. 2, an illustration of a block diagram of a satellite in a satellite system is depicted in accordance with an illustrative embodiment. In this illustrative example, satellite 200 is an example of a satellite within group of satellites 104 in navigation environment 100 in FIG. 1. In particular, satellite 200 may take the form of global positioning system satellite 202.

In this illustrative example, satellite 200 comprises frame 204 associated with components 205. When one component is "associated" with another component, the association is a physical association in these depicted examples. For example, a first component may be considered to be associated with a second component by being secured to the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed as part of and/or an extension of the second component.

In these illustrative examples, components 205 may include propulsion system 206, controller 212, location information transmission system 214, and other suitable components. Propulsion system 206 is configured to change a movement of satellite 200. For example, propulsion system 206 may be used to speed up, slow down, change direction, or cause some other change in movement of satellite 200.

In particular, propulsion system 206 may be used to cause satellite 200 to perform different maneuvers. Propulsion system 206 may be used to perform maneuvers, such as, for example, without limitation, orbit insertion, station keeping, and other suitable maneuvers. As depicted, orbit insertion involves moving satellite 200 into an orbit. This movement of satellite 200 into an orbit may occur after satellite 200 is detached or disconnects from a launch vehicle. Station keeping may be performed to maintain satellite 200 in a desired orbit.

Controller 212 is configured to control the operation of satellite 200. As depicted, controller 212 may control the operation of propulsion system 206, location information transmission system 214, and other components that may be present in satellite 200. Controller 212 includes hardware and also may include software. Controller 212 may be implemented using a computer, an integrated circuit, a programmable logic array, and other suitable hardware components.

In these illustrative examples, location information transmission system 214 comprises transmitter 216 and antenna system 218. Transmitter 216 is a hardware device and may include software. Transmitter 216 is configured to generate location information 224. Location information 224 is any information that may be used by a receiver of location information 224 to identify a location of the receiver. Location information 224 is used in conjunction with location information generated by other satellites in a satellite system in these illustrative examples. Location information 224 may include at least one of data about the orbit of satellite 200, a position of transmitter 216, a time of transmission for the position of transmitter 216, and other suitable information.

In these illustrative examples, location information 224 is transmitted using antenna system 218. Antenna system 218 emits electromagnetic radiation 226 with location information 224 encoded into electromagnetic radiation 226. This transmission of electromagnetic radiation 226 may be signals 228. In particular, electromagnetic radiation 226 may form radio waves 230.

In these illustrative examples, antenna system 218 includes at least one of forward antenna 220 and aft antenna 222. Forward antenna 220 is configured to transmit electromagnetic radiation 226 in a direction toward the surface of the earth. Aft antenna 222 is configured to transmit electromagnetic radiation 226 in a direction away from the surface of the earth.

This direction may be a direction along axis 231 extending through satellite 200 and the center of the earth. Axis 231 may extend through the center of satellite 200, through a center of gravity for satellite 200, or through some other reference point for satellite 200.

Axis 231 may be referred to as z-axis 233. The direction towards the earth from satellite 200 is a +z direction along z-axis 233. The direction away from the earth from the satellite is a −z direction along z-axis 233.

Forward antenna 220 transmits location information 224 usable by receivers located on the ground or at locations in space or in the air that are lower than satellite 200. Forward antenna 220 transmits electromagnetic radiation 226 along z-axis 233 in the +z direction. In other words, these receivers are closer to the earth than satellite 200. This transmission of electromagnetic radiation 226 may be detected by spacecraft closer to the earth than satellite 200. These spacecraft may be referred to as low-orbit vehicles. Examples of low-orbit vehicles may include, for example, a space shuttle, a space station, and other suitable spacecraft.

In these illustrative examples, aft antenna 222 transmits location information 224 in electromagnetic radiation 226 in a direction away from the surface of the earth. This transmission of electromagnetic radiation 226 by aft antenna 222 is along z-axis 233 in the −z direction in the depicted examples. The direction of transmission of electromagnetic radiation 226 by aft antenna 222 is one that can be received by receivers located in positions farther away from the earth than satellite 200.

As depicted, location information 224 also may be transmitted in electromagnetic radiation 226 in a direction toward receivers located farther away from the earth than satellite 200 by controlling radiation pattern 232 of electromagnetic radiation 226 transmitted from forward antenna 220. In these illustrative examples, radiation pattern 232 has main lobe 234 and number of side lobes 236. Main lobe 234 is typically directed toward the earth along an axis extending from satellite 200 toward the center of the earth. Main lobe 234 may be directed along z-axis 233 toward the surface of the earth.

Main lobe 234 is typically harder to detect than desired by spacecraft that are in positions higher above the earth than satellite 200. In particular, main lobe 234 is directed toward the earth and not toward the position of other spacecraft that are higher than that of satellite 200. Further, the coverage of main lobe 234 typically encompasses the earth and does not provide much signal strength away from the earth.

In these illustrative examples, number of side lobes 236 is normally configured to be reduced in strength. In these illustrative examples, transmitter 216 is configured to increase a strength of electromagnetic radiation 226 for signals 228 in a direction away from the surface of the earth. In particular, transmitter 216 is configured to increase a strength of electromagnetic radiation 226 in number of side lobes 236 in radiation pattern 232 that is in a direction away from the surface of the earth. Number of side lobes 236 may be one or more of the side lobes in radiation pattern 232.

As depicted, the strength of number of side lobes 236 is increased such that receivers located at positions farther away from the earth may detect electromagnetic radiation 226 in a manner to use location information 224. The number of side lobes may not be along z-axis 233 but may be along other axes that do not extend between satellite 200 and the earth.

Figure 3:
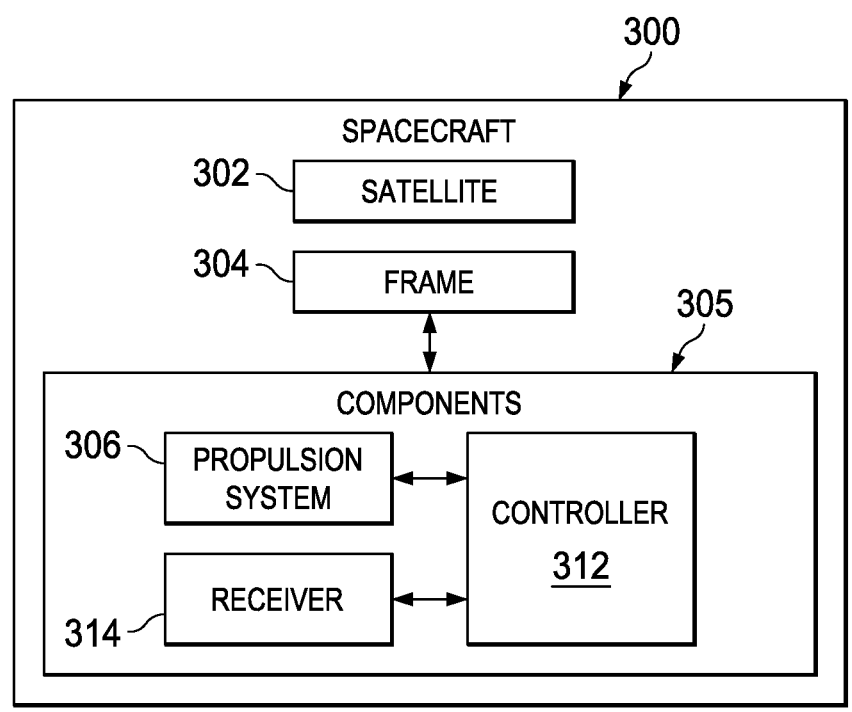
FIG. 3 is an illustration of a block diagram of a spacecraft in accordance with an illustrative embodiment.

With reference now to FIG. 3, an illustration of a block diagram of a spacecraft is depicted in accordance with an illustrative embodiment. In this illustrative example, spacecraft 300 is an example of an implementation for spacecraft 106 in FIG. 1.

In this depicted example, spacecraft 300 takes the form of satellite 302. Spacecraft 300 includes frame 304 associated with components 305. As depicted, components 305 comprise propulsion system 306, controller 312, receiver 314, and other suitable components. In these illustrative examples, receiver 314 is configured to receive radio waves, such as radio waves 230 transmitted by satellite 200 in FIG. 2.

Receiver 314 is configured to receive signals 228 from satellite 200 in FIG. 2. These signals may be electromagnetic radiation 226 that takes the form of radio waves 230. Receiver 314 may identify location information 224 in radio waves 230 in FIG. 2 for use by controller 312 to control the operation of spacecraft 300. In particular, controller 312 may control the operation of propulsion system 306 to perform various maneuvers, such as orbit insertion, station keeping, and other suitable maneuvers.

The illustration of navigation environment 100 in FIG. 1, satellite 200 in FIG. 2, and spacecraft 300 in FIG. 3 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, one or more spacecraft in addition to spacecraft 106 may be present in navigation environment 100 in FIG. 1. These other spacecraft may also perform maneuvers using location information 114 transmitted by group of satellites 104 in satellite system 102 to perform different maneuvers.

As illustrated, satellite 200 in FIG. 2 may include other components. For example, satellite 200 also may include a receiver to receive communications from a ground station or other location. Additionally, satellite 200 also may omit aft antenna 222 in some illustrative examples.

In still other illustrative examples, satellite 200 and spacecraft 300 may include other components not shown. For example, satellite 200 and spacecraft 300 may include power systems, payloads, thermal protection systems, and other components.

In other illustrative examples, spacecraft 300 may take other forms other than satellite 302. For example, without limitation, spacecraft 300 may take the form of a shuttle, a space station, or some other suitable type of spacecraft. When spacecraft 300 takes the form of a shuttle or other type of spacecraft, spacecraft 300 also may include an environmental system for human operators. Additionally, spacecraft 300 also may receive location information 224 transmitted by other satellites for use in identifying the location of spacecraft 300.

Figure 4:
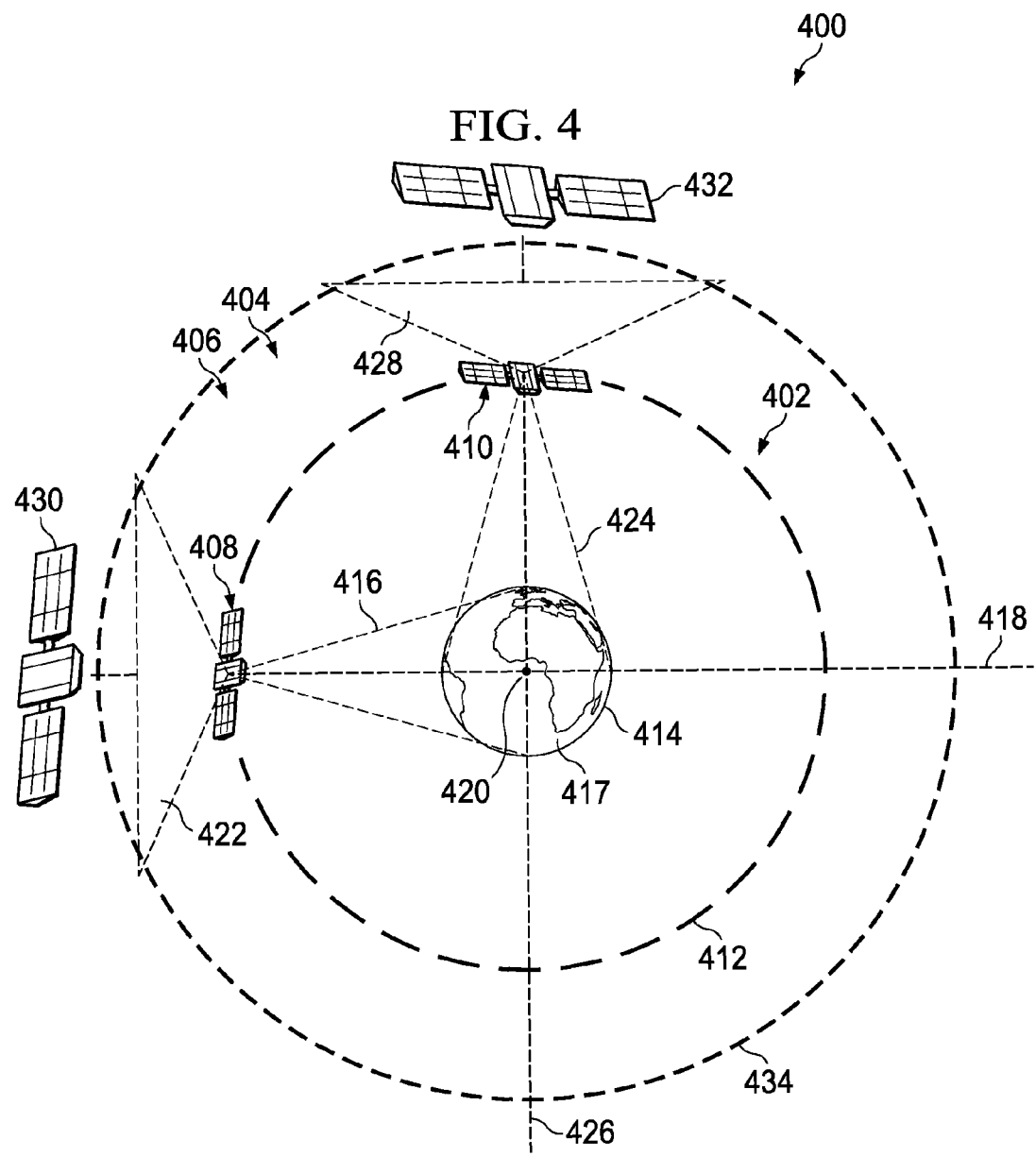
FIG. 4 is an illustration of a navigation environment in accordance with an illustrative embodiment.

With reference now to FIG. 4, an illustration of a navigation environment is depicted in accordance with an illustrative embodiment. In this illustrative example, navigation environment 400 is an example of an implementation for navigation environment 100 shown in block form in FIG. 1.

As depicted, navigation environment 400 includes satellite system 402. Satellite system 402 includes group of satellites 404. In these illustrative examples, group of satellites 404 takes the form of global positioning system satellites 406. In this illustrative example, satellite 408 and satellite 410 are examples of satellites within group of satellites 404. Satellite 408 and satellite 410 travel in orbit 412.

Additional satellites are present in additional orbits in these illustrative examples but are not shown in this illustrative example. Only two satellites, satellite 408 and satellite 410, are illustrated for purposes of discussing features in the illustrative embodiments.

In one illustrative example, group of satellites 404 for satellite system 402 may include 24 satellites with six orbits. With this example, four satellites in group of satellites 404 may orbit around Earth 414.

As depicted, satellite 408 transmits radio waves 416 in a direction toward surface 417 of Earth 414. In this illustrative example, radio waves 416 are transmitted in a direction along axis 418 away from surface 417 of Earth 414. Axis 418 extends through satellite 408 and center 420 of Earth 414.

Additionally, satellite 408 is configured to transmit radio waves 422 in a direction away from Earth 414. The transmission of radio waves 422 may be along axis 418 in a direction away from Earth 414.

In a similar fashion, satellite 410 transmits radio waves 424 in a direction along axis 426 toward surface 417 of Earth 414. Axis 426 extends through satellite 410 and center 420 of Earth 414.

Additionally, satellite 410 also transmits radio waves 428 in a direction away from Earth 414. In this illustrative example, radio waves 428 are transmitted in a direction along axis 426 away from surface 417 of Earth 414. In these illustrative examples, axis 418 and axis 426 may be referred to as a z-axes. In these illustrative examples, the satellite may be the zero value along a z-axis. Points along the z-axis from the satellite toward center 420 of Earth 414 are positive z-values, while points along the z-axis away from center 420 of Earth 414 are negative z-values.

Further, although radio waves 422 and radio waves 428 are directed along the z-axis in a direction away from surface 417 of Earth 414, these signals may be directed along other axes in a direction away from surface 417 of Earth 414. For example, other axes relative to a satellite may be used to transmit signals in a direction away from surface 417 of Earth 414.

The transmission of radio waves 422 and radio waves 428 may aid in the navigation of spacecraft, such as satellite 430 and satellite 432. The transmission of radio waves 422 and radio waves 428 may allow satellite 430 and satellite 432 to receive location information transmitted by satellite 408 and satellite 410 as well as other satellites in group of satellites 404 not shown in this example. By transmitting radio waves 422 and radio waves 428 in a direction away from surface 417 of Earth 414, spacecraft, such as satellite 430 and satellite 432, in positions farther away from surface 417 of Earth 414 as compared to satellite 408 and satellite 410, may receive and use location information to perform maneuvers.

In these illustrative examples, satellite 430 and satellite 432 may use location information transmitted by satellite 408 and satellite 410 to perform maneuvers, such as station keeping. In particular, the spacecraft may use location information from these two satellites and two other satellites (not shown) in group of satellites 404 to identify the location of the spacecraft for performing maneuvers. In this manner, satellite 430 and satellite 432 may maintain their positions in orbit 434 in these illustrative examples.

Figure 5:
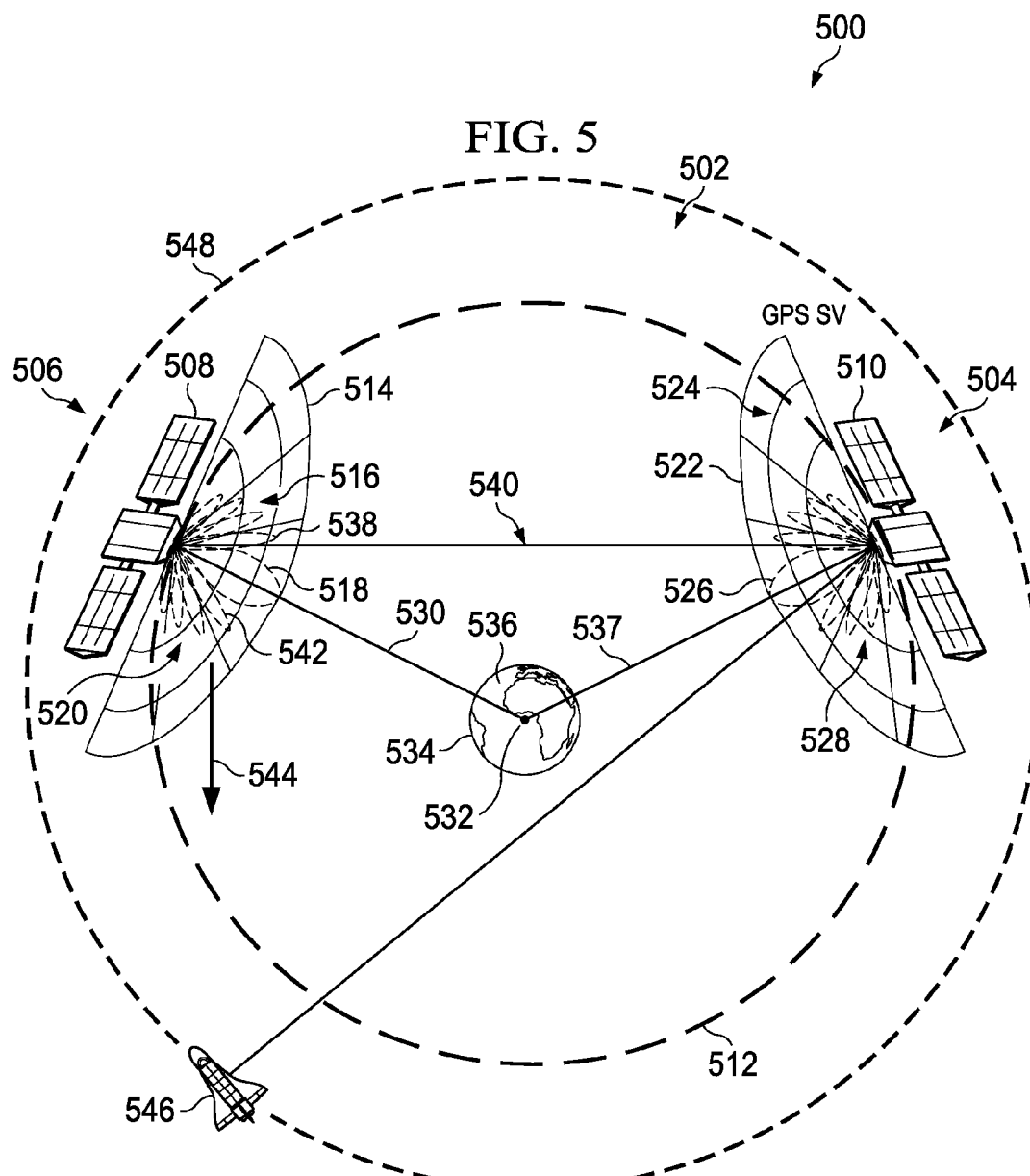
FIG. 5 is an illustration of a navigation environment in accordance with an illustrative embodiment.

With reference now to FIG. 5, an illustration of a navigation environment is depicted in accordance with an illustrative embodiment. In this illustrative example, navigation environment 500 is an example of an implementation of navigation environment 100 shown in block form in FIG. 1.

As depicted, navigation environment 500 includes satellite system 502. Satellite system 502 includes group of satellites 504. Group of satellites 504 takes the form of global positioning system satellites 506 in these depicted examples.

Satellite 508 and satellite 510 are examples of satellites within group of satellites 504. Satellite 508 and satellite 510 travel in orbit 512. In this illustrative example, additional satellites may be present in additional orbits but are not shown in this depicted example. Only satellite 508 and satellite 510 are illustrated to discuss features in the illustrative embodiments.

In this illustrative example, satellite 508 emits electromagnetic radiation 514 with radiation pattern 516. As depicted, radiation pattern 516 includes main lobe 518 and number of side lobes 520.

In a similar fashion, satellite 510 transmits electromagnetic radiation 522 having radiation pattern 524. Radiation pattern 524 includes main lobe 526 and number of side lobes 528.

In these illustrative examples, main lobe 518 transmitted by satellite 508 is transmitted along axis 530. Axis 530 extends through satellite 508 and center 532 of Earth 534. Main lobe 526 is transmitted in a direction along axis 537 toward surface 536 of Earth 534. Axis 537 extends through satellite 510 and center 532 of Earth 534.

Both main lobe 518 and main lobe 526 are transmitted in a direction toward surface 536 of Earth 534. In these illustrative examples, number of side lobes 520 and number of side lobes 528 are transmitted in directions away from surface 536 of Earth 534. Although these directions may not be in an opposite direction with respect to axis 530 and axis 537, these directions are considered to be away from Earth 534. For example, lobe 538 in number of side lobes 520 is in a direction of arrow 540. As can be seen, this direction is away from surface 536 of Earth 534. In a similar fashion, lobe 542 in number of side lobes 520 is in a direction of arrow 544. Although these directions may not be in an aft direction, such as a direction along axis 530 away from surface 536 of Earth 534, these directions are considered to be away from surface 536 of Earth 534.

In these illustrative examples, the strength of number of side lobes 520 and number of side lobes 528 are increased such that a spacecraft, such as spacecraft 546, may be able to detect the signals from these side lobes without using receivers having increased sensitivity or complexity.

In this illustrative example, spacecraft 546 is in orbit 548. Spacecraft 546 has a position farther away from Earth 534 than satellite 508 and satellite 510. In other words, spacecraft 546 is considered to have a higher position than satellite 508 and satellite 510. Spacecraft 546 may identify its location using location information transmitted in number of side lobes 520 from satellite 508 and number of side lobes 528 from satellite 510.

Additionally, spacecraft 546 also may use location information transmitted by side lobes from other satellites in satellite system 502 to identify a location of spacecraft 546. With the identification of the location of spacecraft 546 using the location information, spacecraft 546 may perform different maneuvers. In particular, spacecraft 546 also may identify its trajectory or direction of movement as a vector.

Figure 6:
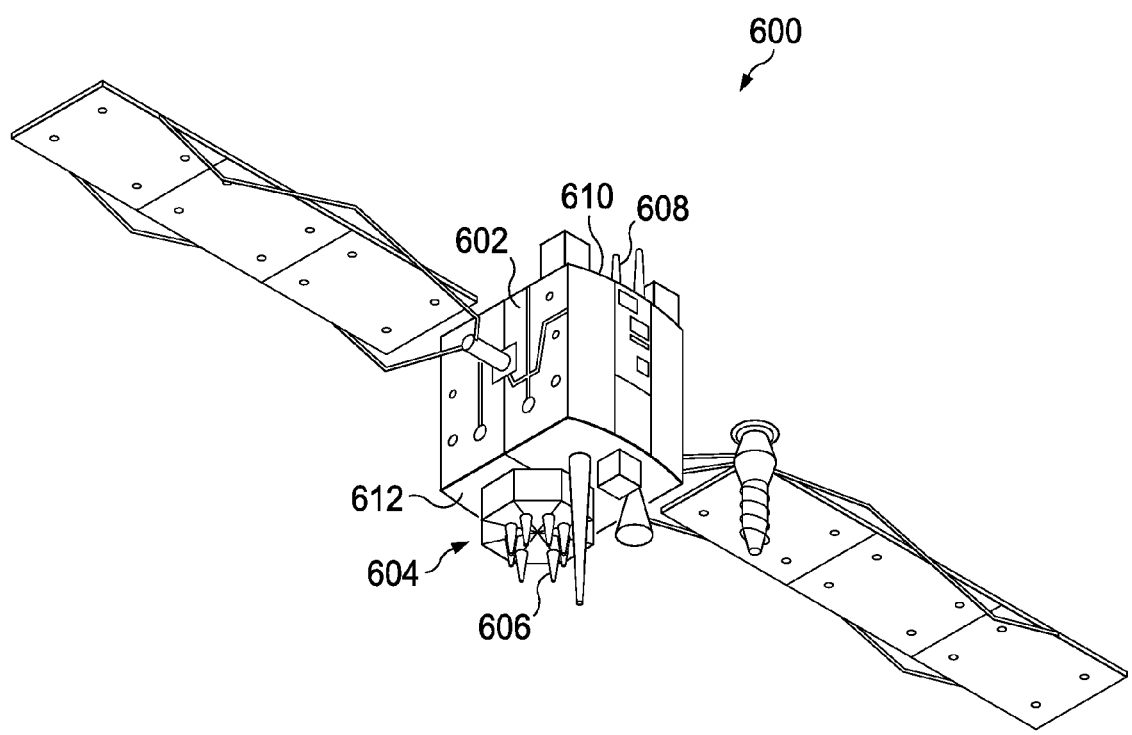
FIG. 6 is an illustration of a satellite in accordance with an illustrative embodiment.

With reference now to FIG. 6, an illustration of a satellite is depicted in accordance with an illustrative embodiment. In this illustrative example, satellite 600 is an example of an implementation for satellite 200 in FIG. 2. Satellite 600 is an example of a satellite that may be used for satellite 408 and satellite 410 in FIG. 4.

As depicted, satellite 600 has frame 602. Satellite 600 includes antenna system 604. Antenna system 604 has forward antenna 606 and aft antenna 608.

In these illustrative examples, forward antenna 606 and aft antenna 608 may be implemented using L-band antennas. An L-band antenna is an antenna that may transmit radio waves at a frequency that is about 2 GHz or less. If other frequencies, such as frequencies above 2 GHz, are used, other antennas, such as an S-band antenna, may be used for forward antenna 606 and aft antenna 608.

Forward antenna 606 is configured to transmit radio waves in the direction of the surface of the earth, such as radio waves 416 in FIG. 4. Aft antenna 608 is configured to transmit radio waves away from the earth, such as radio waves 422 in FIG. 4. Aft antenna 608 is located on aft side 610 of satellite 600. In this illustrative example, aft antenna 608 is shown having an orientation that is substantially perpendicular to aft side 610 of satellite 600. Forward antenna 606 is located on forward side 612 of satellite 600. In this illustrative example, forward antenna 606 is shown having an orientation that is substantially perpendicular to forward side 612 of satellite 600. In these illustrative examples, aft antenna 608 is added to satellite 600 to provide for additional coverage in the transmission of radio waves by satellite 600.

The different components illustrated in FIGS. 4-6 are not meant to imply physical or architectural limitations to the manner in which illustrative embodiments may be implemented. These components are illustrations of only some components that may be used in a navigation environment.

For example, other numbers of satellites other than those depicted in FIGS. 4 and 5 may be used for providing location information in the navigation environments. In particular, navigation environment 400 in FIG. 4 is described as having 24 satellites in six orbits. Other numbers of satellites and other numbers of orbits may be used in other illustrative examples. For example, navigation environment 400 may use 30 satellites to provide additional coverage or redundancy for satellite system 402.

As another illustrative example, satellite 600 may have an antenna in other locations other than on aft side 610, in other orientations than shown for aft antenna 608, or a combination of the two. For example, an antenna may be located on a side of satellite 600 between aft side 610 and forward side 612. Further, an antenna mounted on aft side 610 may have an angle relative to aft side 610 rather than having a substantially perpendicular orientation, such as that shown for aft antenna 608.

The different components shown in FIGS. 4-6 may be combined with components in FIGS. 1-3, used with components in FIGS. 1-3, or a combination of the two. Additionally, some of the components in FIGS. 4-6 may be illustrative examples of how components shown in block form in FIGS. 1-3 can be implemented as physical structures.

Figure 7:
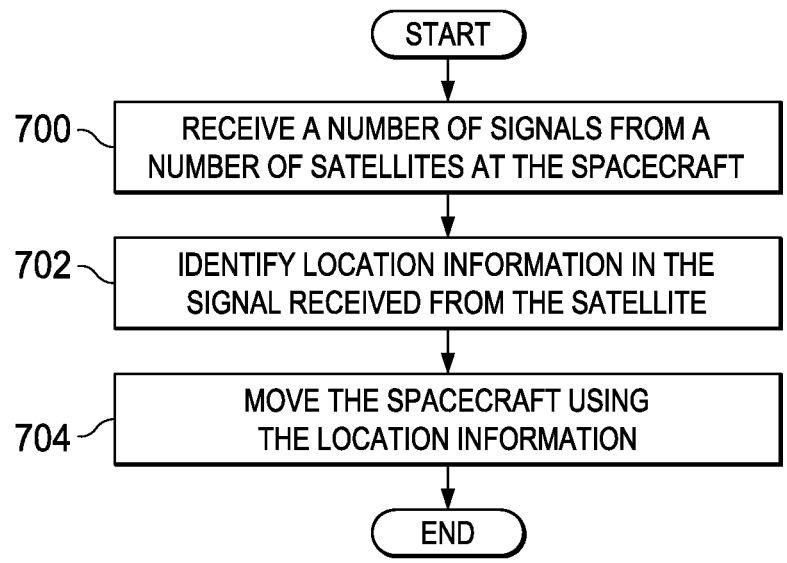
FIG. 7 is an illustration of a flowchart of a process for moving a spacecraft in accordance with an illustrative embodiment.

Turning now to FIG. 7, an illustration of a flowchart of a process for moving a spacecraft is depicted in accordance with an illustrative embodiment. The process illustrated in FIG. 7 may be implemented in navigation environment 100 in FIG. 1. In particular, one or more operations may be performed using a spacecraft, such as spacecraft 106 in FIG. 1.

The process begins by receiving a number of signals from a number of satellites at the spacecraft (operation 700). In this illustrative example, a signal in the number of signals is transmitted from an antenna system associated with the satellite in which the antenna system is configured to transmit the signal in a direction away from a surface of the earth.

In these illustrative examples, this transmission may be performed using a satellite antenna located on an aft side of the satellite. In another illustrative example, this transmission may be performed by configuring an antenna on the forward side of the satellite to increase a strength of lobes in a radiation pattern that are directed away from the surface of the earth. The process then identifies location information in the signal received from the satellite (operation 702).

The process then moves the spacecraft using the location information (operation 704), with the process terminating thereafter. The movement of the spacecraft may include a maneuver, such as at least one of an orbit insertion, station keeping, and other suitable maneuvers. This movement may include changing the current movement of the spacecraft. For example, the speed at which the spacecraft moves may be increased, decreased, or halted.

The flowchart and block diagrams in the different depicted embodiments illustrate the architecture, functionality, and operation of some possible implementations of apparatuses and methods in an illustrative embodiment. In this regard, each block in the flowchart or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowchart or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, the location information may be received and identified from four or more satellites at the same time. As another illustrative example, additional operations may be included to identify a maneuver and a path for the spacecraft based on the location information. In yet another illustrative example, operations may be included in which the spacecraft may select signals from satellites providing the best signal strength.

Thus, the different illustrative embodiments may allow a spacecraft to know its position at different times and locations in space. The identification of the position may be performed without requiring use of ground stations. Further, with the use of navigation environment 100 in FIG. 1, a spacecraft may automatically perform different types of maneuvers. For example, a spacecraft may perform a station keeping maneuver. This maneuver may be performed to correct for orbital drift. This correction may be performed without requiring commands or information from a ground station.

With navigation environment 100, distortions or noise that may be caused by signals traveling through an atmosphere or ionosphere of the earth, as well as other interference factors, may be reduced by increasing the strength of side lobes in the radiation pattern.

When an antenna pointing away from the surface of the earth is used, the signals from that antenna may avoid traveling through the earth's atmosphere. As a result, delay variations, distortions, and other noise may be reduced or avoided.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different characteristics as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a satellite;
   an antenna system associated with the satellite, wherein the antenna system is configured to transmit a signal in a direction away from a surface of an earth; and
   a transmitter in the satellite, wherein the transmitter is configured to transmit location information in the signal using the antenna system, and the transmitter is configured to increase a strength of electromagnetic radiation for the signal in the direction away from the surface of the earth.

2. The apparatus of claim 1, wherein the signal is transmitted from an antenna in the antenna system that is located on an aft side of the satellite and wherein the aft side faces away from the surface of the earth.

3. The apparatus of claim 2, wherein the antenna is configured to transmit the signal along an axis extending through the satellite and a center of the earth in a direction away from the surface of the earth.

4. The apparatus of claim 1, wherein electromagnetic radiation for the signal has a radiation pattern and wherein an antenna is configured to increase a strength in a number of side lobes in the radiation pattern that is in the direction away from the surface of the earth.

5. The apparatus of claim 1, wherein the signal is a radio wave.

6. The apparatus of claim 1, wherein the location information comprises at least one of data about a position of the satellite, a position of the transmitter, and a time of transmission for the position of the transmitter.

7. The apparatus of claim 1 further comprising:
a spacecraft having a receiver configured to receive the signal from the satellite and a number of additional satellites and perform a maneuver using the location information in the signal.

8. The apparatus of claim 7, wherein the maneuver is selected from at least one of orbit insertion and station keeping.

9. The apparatus of claim 7, wherein the spacecraft is in a position farther away from the earth than the satellite.

10. A method for moving a spacecraft, the method comprising:
receiving a number of signals from a number of satellites at the spacecraft, wherein the number of signals is transmitted from a number of antenna systems associated with the number of satellites and the number of antenna systems is configured to transmit the number of signals in a direction away from a surface of an earth, and the number of antenna systems is configured to increase a strength of electromagnetic radiation for the signals in the direction away from the surface of the earth;
identifying location information in the number of signals received from the number of satellites; and
moving the spacecraft using the location information.

11. The method of claim 10 further comprising:
identifying a location of the spacecraft using the location information in the number of signals.

12. The method of claim 10, wherein moving the spacecraft using the location information comprises:
performing a maneuver selected from one of orbit insertion and station keeping.

13. The method of claim 10, wherein the spacecraft is farther away from the earth than the number of satellites.

14. The method of claim 10, wherein the spacecraft is a satellite in an orbit that is higher than a number of orbits for the number of satellites.

15. The method of claim 10, wherein the number of signals is transmitted from an antenna in the number of antenna systems that is located on an aft side of the number of satellites and wherein the aft side faces away from the surface of the earth.

16. The method of claim 15, wherein the antenna is configured to transmit the number of signals along an axis extending through the number of satellites and a center of the earth in the direction away from the surface of the earth.

17. The method of claim 10, wherein the number of signals is electromagnetic radiation having a radiation pattern and wherein an antenna is configured to increase a strength in a number of side lobes in the radiation pattern that is in the direction away from the surface of the earth.

18. The method of claim 10, wherein a signal in the number of signals is a radio wave.

* * * * *